No. 632,064. Patented Aug. 29, 1899.
D. J. ROBERTS.
TRIPOD.
(Application filed Nov. 14, 1898.)
(No Model.)
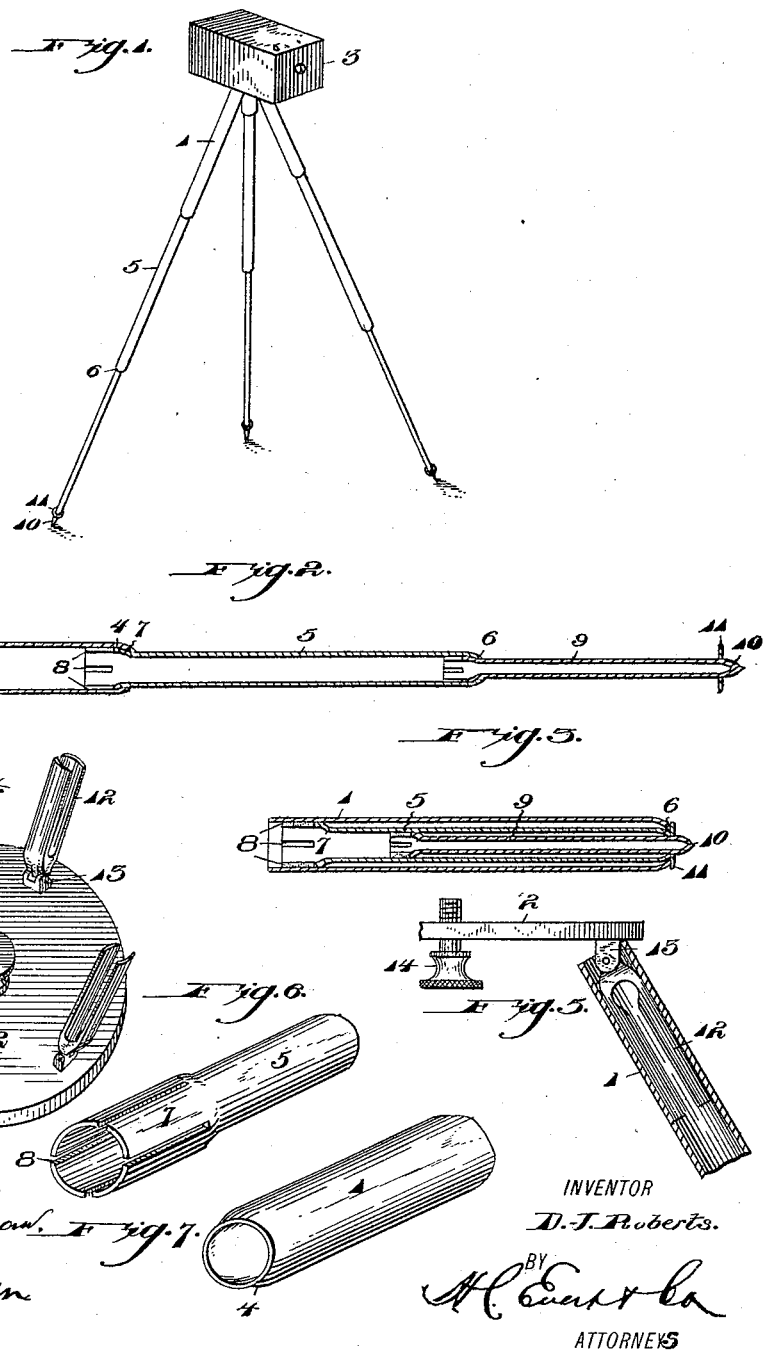

UNITED STATES PATENT OFFICE.

DAVID J. ROBERTS, OF PITTSBURG, PENNSYLVANIA.

TRIPOD.

SPECIFICATION forming part of Letters Patent No. 632,064, dated August 29, 1899.

Application filed November 14, 1898. Serial No. 696,352. (No model.)

*To all whom it may concern:*

Be it known that I, DAVID J. ROBERTS, a citizen of the United States of America, residing at Pittsburg, in the county of Allegheny and State of Pennsylvania, have invented certain new and useful Improvements in Tripods, of which the following is a specification, reference being had therein to the accompanying drawings.

My invention relates to certain new and useful improvements in tripods.

My invention particularly relates to constructing a telescopic rod which can be used for a tripod as well as for various other purposes.

A further object of my invention is to provide a telescopic rod having a frictional joint formed on the upper end on each section for securing the same in the adjacent section in the desired position when extended.

The particular feature of my invention comprises a telescopic rod formed of a series of hollow sections or tubes, the upper end of each section having a frictional joint formed thereon and the lower end being somewhat compressed to prevent the disconnection of the sections when extended.

My invention finally consists in the novel combination and arrangement of parts hereinafter more fully described, and particularly pointed out in the claims.

In describing the invention in detail reference is had to the accompanying drawings, forming a part of this specification, wherein like numerals of reference indicate corresponding parts and in which for illustration I have shown my improved telescopic rod as used in a tripod.

In the drawings, Figure 1 is a perspective view of my improved telescopic rod as set up as a tripod and attached to the supporting-plate for the camera. Fig. 2 is a longitudinal sectional view of my improved telescopic rod when extended. Fig. 3 is a longitudinal sectional view of my improved telescopic rod closed. Fig. 4 is a perspective view of the supporting-plate for the camera, showing means for securing my telescopic rods in position. Fig. 5 is a side view of the supporting-plate for the camera, showing the upper section of my improved telescopic rod in section secured thereto. Fig. 6 is a perspective view of a portion of one of the sections, showing the frictional joint. Fig. 7 is a perspective view of the lower portion of one of the sections, showing the compressed end to prevent the disconnection of the sections when extended.

Referring to the drawings by reference-numerals, 1 indicates the upper section of my improved telescopic rod, which is tubular in shape and may be formed of any suitable metallic material and for illustration is shown connected to the supporting-plate 2 for the camera 3.

The lower end of the section 1 is compressed, as at 4, to prevent the disconnection of the adjacent section. The section 5 is compressed at its lower end, as at 6, in the same manner as the section 1, and it is enlarged at its upper end, as at 7. This enlarged upper end has a series of slits 8 cut therein, thereby forming the frictional joint for holding the sections together when extended. The lower section 9 has its lower end 10 tapering, as shown, to prevent the slipping of the rod when set up, while the upper end is formed with a frictional joint in the same manner as section 5. 11 indicates a stop for arresting the movement of the sections of the rods when in a closed position.

12 indicates a series of spring-catches which are secured to the underneath face of the supporting-plate 2, as at 13, and 14 indicates a securing-screw for the camera 3.

It will be readily apparent that owing to the arrangement of the frictional joint on the upper end of the sections when the same are extended to any position this frictional joint will securely hold the sections in a locked position and prevent the slipping thereof.

It will be noted that various changes may be made in the details of construction without departing from the general spirit of my invention.

Having thus fully described my invention, what I claim as new, and desire to secure by Letters Patent, is—

1. A telescopic rod for tripods and the like comprising a series of sections each of which is formed with a compressed lower end and each of which except the uppermost section has an enlarged slitted end adapted to frictionally engage the adjacent section, substantially as herein shown and described.

2. In a tripod, the combination of a supporting-plate, a series of telescopic rods each of which is formed of a series of hollow telescopic sections and each of which sections has a compressed lower end and each section except the uppermost one of each rod having an enlarged slitted end to form a frictional joint with the adjacent section, and a series of spring-catches pivotally secured to the underneath face of the supporting-plate to engage and form a frictional joint with the upper sections of the rods, substantially as described.

In testimony whereof I affix my signature in the presence of two witnesses.

DAVID J. ROBERTS.

Witnesses:
JOHN NOLAND,
H. H. PATTERSON.